United States Patent [19]

SenGupta

[11] Patent Number: 4,496,489

[45] Date of Patent: Jan. 29, 1985

[54] SEPARATION PROCESS AND PRODUCTS OBTAINED THEREBY

[75] Inventor: Achintya K. SenGupta, Schenefeld, Fed. Rep. of Germany

[73] Assignee: Lever Brothers Company, New York, N.Y.

[21] Appl. No.: 307,472

[22] Filed: Oct. 1, 1981

[30] Foreign Application Priority Data

Oct. 2, 1980 [GB] United Kingdom ............... 8031784

[51] Int. Cl.$^3$ ............................ C09F 5/10; C11B 3/00
[52] U.S. Cl. ................................ 260/428.5; 260/403; 260/412.5; 260/428
[58] Field of Search .................... 260/403, 412.5, 428, 260/428.5

[56] References Cited

U.S. PATENT DOCUMENTS

| | | | |
|---|---|---|---|
| 3,847,804 | 11/1974 | Del Pico | 210/23 |
| 4,093,540 | 6/1978 | Gupta | 260/403 |
| 4,166,823 | 9/1979 | Sietz | 260/403 |
| 4,210,594 | 7/1980 | Logan et al. | 260/428.5 |
| 4,235,793 | 11/1980 | Betzing | 260/403 |
| 4,240,914 | 12/1980 | Iwama et al. | 210/500.2 X |
| 4,316,730 | 2/1982 | Eibl | 260/403 X |

Primary Examiner—Helen M. S. Sneed
Attorney, Agent, or Firm—James J. Farrell

[57] ABSTRACT

The invention provides a process for fractionation of compounds which in essentially non-polar solvents form mixed or co-micelles and hence cannot normally be fractionated by membrane filtration. By dissolving a mixture of such compounds in a solvent system in which selective micelles formation occurs, and contacting the solution under pressure with a semipermeable membrane to separate the mixture into a permeate and a retentate, fractionation of the compound mixture can be achieved, i.e. a fraction enriched in one of said compounds can be recovered from the permeate and/or the retentate by removing solvent therefrom. The new process is in particular useful for fractionating phosphatides-containing mixtures into a fraction enriched in phosphatidyl choline by ultrafiltration of a solution of the mixture in a solvent system comprising an essentially non-polar solvent and a polar solvent, e.g. hexane-ethanol, etc., through a semipermeable membrane, and recovering a fraction enriched in phosphatidyl choline from the permeate. A fraction enriched in phosphatidyl inositol can be recovered from the retentate.

15 Claims, No Drawings

SEPARATION PROCESS AND PRODUCTS OBTAINED THEREBY

The invention relates to a process for recovering from a mixture, containing compounds which in essentially non-polar solvents form mixed micelles or co-micelles, a fraction enriched in one of said compounds.

A particular class of such compounds is the phosphatides or phospholipids from vegetable or animal origin. These phospholipids, particularly the phospholipids of soybeans, form micellar aggregates in non-polar organic solvents, particularly in hexane. These micelles are formed by molecular association and may have molecular weights as high as 500,000. The polar and the charged moieties of the phospholipids form the core of the micelles, whereas the hydrocarbon moieties of the esterified fatty acids form the unpolar outer shells. Many polar non-lipid components, such as sugars, sterol glucosides, water, proteins etc. may be co-micellised, i.e. these components are accomodated in the polar core of the phospholipid micelles. Due to the formation of the micelles, the phospholipids become easily soluble in hexane despite their polar and ionic structures. The same is true for sugars, sterol glucosides, etc., etc., which are also solubilised in hexane by the formation of co-micelles.

Soyabean oil is usually obtained industrially from the crushed and pelleted beans by extraction with hot hexane. The hexane solution mainly contains glyceride oil, but also minor amounts of phospholipids, free sugars, sterols, sterol glucosides, etc. The ratio of phospholipids to glyceride oil is usually between 1:30 and 1:40. The phospholipids are principally made up of 4 components: Phosphatidyl Choline (henceforth called PC), Phosphatidyl Ethanolamine (PE), Phosphatidyl Inositol (PI), Phosphatidic Acid (PA). In addition the soyabean phospholipids also contain minor amounts of other compounds, e.g. Phosphatidyl Serine (PS), Cardiolipin (CL), Sphingophosphatides (SP), and partially hydrolysed species which are generally called Lysophospholipids, e.g. Lysophosphatidyl Choline (LPC).

In the crude hexane extract of the soyabeans, all these different phospholipid species are present as mixed micelles, which also include the co-micellised non-lipids, such as free sugars, sterol glucosides, etc.

For refining the crude soyabean oil the phospholipids and their contaminations with sugars, etc. have to be removed. We have invented a process (British Pat. No. 1,509,543) in which the crude hexane extract of the soyabeans, also called crude soyabean oil hexane miscella, is ultra-filtered under pressure through a suitable semipermeable membrane, which allows the passage of the glyceride oil solution in hexane, but retains all the phospholipids together with sugars, sterol glucosides, etc., which form co-micelles with phospholipids in hexane solution. This process allows thus a complete separation of phosphorus free lipids (i.e. triglycerides, free fatty acids, etc.) from phospholipids and non-lipids (e.g. sugars etc.) associated with them. The removal of hexane from the ultra-filtrate yields an oil completely free of phosphatides, whereas the retentate miscella yields commercial lecithin on distillation.

These types of commercial lecithins may also be obtained by other means, e.g. by first distilling off the hexane from the crude soyabean oil hexane miscella and subsequently separating the phospholipids by hydration with hot water or steam, which renders them insoluble in oil from which they can then easily be recovered by centrifuging. In addition to phospholipids the commercial lecithins also contain glyceride fats, pigments, sugars, sterol glycosides and other impurities. The following Table gives an approximate composition of commercial soyabean lecithin:

| | | |
|---|---|---|
| Glyceride fats | about | 35% |
| Free sugars | about | 3–5% |
| Sterol glucosides and their esters | about | 5–7% |
| PC | about | 13–15% |
| PE | about | 12–14% |
| PA | about | 9–12% |
| PI | about | 10–15% |
| Other phospholipids | about | 3–5%. |

As already stated, all the phospholipids in hexane solution form mixed micelles of a considerable size, which can be completely separated from glyceride oils by ultra-filtration through a suitable semi-permeable membrane.

It has now surprisingly been found that in certain solvent mixtures the micelles formation is selective, i.e. one or more compounds which normally are incorporated in the large mixed micelles are partly or completely excluded from the micelles and are now present in the solvent mixture in a molecular state. This discovery makes it possible to achieve fractionation of such compounds forming mixed micelles. For example, when a solution of the compounds in a solvent mixture in which selective micelles formation occurs is contacted with a semipermeable membrane, the compound or compounds which are partly or completely excluded from the micelles will pass through the membrane in its molecular dissolved state.

Therefore, the invention provides a process for recovering from a mixture, containing compounds which in essentially non-polar solvents form mixed micelles, a fraction enriched in one of said compounds, by contacting a solution of said mixture in a suitable solvent mixture in which selective micelles formation occurs, under pressure with a semi-permeable membrane to separate the mixture into a permeate and a retentate, and recovering an enriched fraction from the retentate and/or the permeate by removing solvent therefrom.

The process according to the invention is particularly suitable for fractionating phosphatides. When soyabean phospholipids were dissolved in a mixture of a hydrocarbon solvent and an alcohol, e.g. in a mixture of hexane and isopropanol (4:1) (instead of being dissolved in hexane or another pure hydrocarbon solvent), PC was not or incompletely included into the mixed micelles of the phospholipids. Ultra-filtration of such a solution resulted in a filtrate (henceforth called permeate) which mainly contained glyceride fats and PC with smaller amounts of PA and PE. Sugars, PI and some other minor phospholipids were almost completely retained by the membrane as also the major parts of PA and PE. This method thus allows a fractionation of the phospholipids by ultra-filtration in such a way that enriched PC and/or enriched PI may be prepared from a mixture of a large number of phospholipids.

Suitable solvent mixtures comprise an essentially non-polar solvent and a polar solvent. The ratio of the two solvents determines both the selectivity and the yield of the separation process. The optimum ratio of the two solvents depends both on the particular solvents used and on the particular compound to be enriched. The optimum ratio for particular solvents used for a particular separation process can easily be determined by simple experimentation. It has, for instance, been found that when a solution of soyabean phospholipids in a mixture of a non-polar and a polar solvent containing 1–5% of the polar solvent, is contacted with a semi-permeable membrane, most of the sterol glucosides, the sterol glucoside esters, the sterols and the glycerides pass through the membrane. Examples of suitable mixtures of a non-polar and a polar solvent are: hexane/alcohol, diethyl ether/acetone, chloroform/methanol, etc. Hence, a fraction enriched in phosphatides can be recovered from the retentate. However, when the amount of the polar solvent in the retentate solution is raised to 20–25%, the PC passes through the membrane. By this two-stage process a PC-enriched fraction, poor in sugars, sterol, sterol glucosides and esters therefrom and glycerides can be recovered from the last permeate. The resulting product had a very light yellow colour. Of course, the separation process can be repeated any number of times, using the same solvents in different ratios or other solvents in the same or different ratios.

Suitable non-polar solvents are essentially aprotic, such as hexane and other hydrocarbons, ethers, such as diethyl ether, and esters, such as ethyl acetate. Also halogenated hydrocarbons, ethers and esters can be used, for instance chloroform, methyl chloride, methylene chloride. ethylene mono-, di- and trichloride, etc.

Polar solvents are essentially protic; preferably a lower monohydric alcohol is used, such as methanol, ethanol, propanol, iso-propanol, butanol, iso-butanol, etc., or a ketone which in its enolic form behaves like a protic solvent, e.g. acetone, methylethyl ketone, etc.

The ratio of polar to non-polar solvent depends on the kind of substances present, the compounds one wants to retain in the retentate and the ones one wants to pass to the permeate. In general, the solvent mixture contains 1 to 50% by weight of the polar solvent. When one wants PC to pass the membrane, the solvent mixture usually contains 15 to 30% by weight of the polar solvent, preferably 20 to 25% by weight.

For the preparation of PC-enriched fractions the starting material is preferably a vegetable phosphatides-containing mixture, such as crude soyabean phosphatides or lecithin. One can also start from a phosphatide fraction which has been enriched in PC according to another process, for instance by extraction of crude phosphatides with a lower alcohol.

It has further been found that the micelles formation and hence the separation process is influenced by the presence of water. Phosphatides can bind up to 30% of water; so the phosphatides-containing mixtures can contain about 1 to 30% by weight of water.

The micelles formation is further influenced by the presence of salts, in particular salts of bi- and trivalent cations, such as magnesium, calcium, aluminium and iron. Usually, the phosphatides-containing mixture is made to contain about 0.1 to 5% by weight of such a salt. In general, crude phosphatide mixtures contain sufficient magnesium and calcium, but in some cases, especially with alcohol-soluble phosphatide fractions, it is desirable to add more of the same or different cations.

The salts, when added, can be added to the phosphatides-containing mixture to be fractionated, but also to the aqueous sludge obtained by degumming of a vegetable oil and even to the water used for the degumming.

The effect of the addition of water and/or salts is to increase the size of the micelles, allowing membranes with a higher cut-off limit to be used, thereby increasing the throughput. However, also the selectivity may be influenced.

The solution of the compounds to be fractionated is contacted with the membrane under pressure. In general, an absolute pressure of 1 to 50 bar is applied, preferably 2 to 10 bar.

The temperature at which the process is carried out is not critical, and hence the process can be carried out at any temperature between the freezing and the boiling points of the solvent mixture used. But at higher temperatures the flux rate is usually greater.

Semi-permeable membranes, which may be isotropic or anisotropic, porous or non-porous, are characterized by their cut-off limit, which is defined as the size of the molecule or molecule complex which can just pass the membrane. The cut-off limit is expressed in nominal molecular weight units. For the process of the invention membranes with a cut-off limit of between 500 and 300,000 are suitable. The cut-off limit is preferably between 1,000 and 15,000. The membranes should, of course, be resistent to the solvent mixture used. An extensive description of suitable membranes is given in British Patent Specification No. 1,509,543, referred to above, which is incorporated herein by way of reference.

Suitable examples include the Amicon XM and PM series of membranes known as Diaflo membranes comprising a polysulphone skin e.g. a diphenyl-4,4'-disulphonyl or diphenyl-ether-4,4'-disulphonyl polymer, mounted on a polyethylene supporting layer. Other suitable membranes include those marketed by Rhone-Poulenc and comprising a polyacrylonitrile skin, and by Abcor with a polyamide skin.

The membrane may be used in any of the forms conventionally adopted where these are appropriate to the membrane material selected. Thus the membrane may be used in plate, tubular or fibre form, although the elastomeric membranes are less suitable in the latter form. In plate and tubular form at least adequate mechanical support must be provided for the membrane to withstand the hydraulic pressures applied to it to effect filtration. The support may be in the form of porous metal, glass fibre or other porous rigid construction.

In carrying out the process of the invention, it may be necessary to subject the membranes to be used to treatment rendering it suitable for non-aqueous use. As delivered from the manufacturer, for example, many membranes are already soaked in water or glycerol and must be pretreated successively by contact with water, an intermediate solvent and the diluent solvent to be used in the process. Where the latter is hexane, isopropanol may be used as the intermediate solvent, but others will occur to those skilled in the art as suitable. The intermediate solvent must be miscible, if only to a limited extent, both with water and the diluent solvent. It is preferable also to treat the membrane by a similar washing procedure after protracted use, to restore the effectiveness of the membrane.

The invention is further illustrated, but not restricted, by the following Examples.

EXAMPLE 1

2 kg of defatted soyabean lecithin was dissolved in a mixture of 6 kg hexane and 2 kg isopropanol. The resultant solution was ultrafiltered at 50° C. and 3.8 bar through a polyacrylonitrile membrane with a cut-off limit of 15,000 (T6B of Messrs Patterson Candy International, Whitchurch, Hampshire, England (total membrane surface 0.04 m$^2$)).

The first 2.9 kg of permeate, obtained in 2 hours (i.e. flux of 36 kg/m$^2$.h), yielded 31.2 g of phospholipids. The recovered solvent was added to the retentate tank again and the ultrafiltration continued. A total of 6 fractions was obtained.

| Fraction I   | 2.9 kg permeate | 31.2 g phospholipids |
|---|---|---|
| Fraction II  | 3.2 kg permeate | 31.2 g phospholipids |
| Fraction III | 3.1 kg permeate | 34.6 g phospholipids |
| Fraction IV  | 2.5 kg permeate | 24.2 g phospholipids |
| Fraction V   | 3.2 kg permeate | 25.3 g phospholipids |
| Fraction VI  | 1.9 kg permeate | 19.2 g phospholipids |

The total phospholipid permeate (165.7 g) was analysed.

The following Table shows the results as compared with the starting defatted soyabean lecithins.

|  | Defatted soyabean phospholipids | Permeate phospholipids |
|---|---|---|
| Total phosphorus | 3.01 | 2.58 |
| Total sugars | 5.1% | <0.1% |
| PC | 25.0% | 51.2% |
| PE | 24.7% | 14.2% |
| PA | 9.1% | 3.6% |
| PI | 14.5% | 0.3% |
| LPC | 1.6% | 2.8% |
| Other phospholipids | 5.9% | 0.1% |
| Sterol glucosides | 2.1% | 2.6% |
| Esterified sterol glucosides | 7.8% | 10.4% |
| Sundries (sterols + glycerides etc.) | 4.2% | 14.8% |

EXAMPLE 2

A commercial soyabean lecithin sample enriched in PC by alcohol extraction (Bolec F 304 of Oelwerke Spyck) was ultrafiltered as described in Example 1. A total of 1.5 kg of the lecithin was dissolved in a mixture of 7.5 kg hexane and 2.5 kg of isopropanol. A total of 1.066 kg of lecithin was obtained in the permeate. Both the starting Bolec F 304 and the permeate lecithin were defatted and analysed. The results are shown below:

|  | Defatted starting lecithin | Defatted permeate lecithin |
|---|---|---|
| Sugars | 10.2% | <0.1% |
| PC | 52.8% | 65.0% |
| PE | 10.6% | 7.7% |
| PA | 4.0% | 1.2% |
| PI | 3.4% | 1.0% |
| LPC | 1.1% | 2.1% |
| Other phospholipids | 4.5% | 1.2% |
| Other components (sterols, sterol glucosides and esters, etc.) | 13.4% | 21.8% |

These results show that a commercial lecithin can be de-sugared and enriched in PC by filtration through a semi-permeable membrane if it is dissolved in a mixed solvent.

EXAMPLE 3

A sample of soyabean phosphatides (commercial lecithin) was defatted by multiple washing with cold acetone and then dried. 80 g of the defatted phosphatides were dissolved in 320 g of a mixture of hexane and ethanol (75:25, vol/vol). An Amicon 401 S module fitted with a polysulphone membrane PM 10 (also made by Amicon GmbH, Witten (Ruhr), Germany) with a cut-off limit 10,000 was used at 20° C. and 4 bar for ultrafiltering 300 ml of the above-mentioned solution (from a total input of 400 ml). The ultrafiltered permeate solution yielded on evaporation to dryness 8.4 g of light yellow coloured residue which was analysed on the content of the individual lipid species. The defatted commercial lecithin was also analysed in the same way. The results are shown in the following table:

TABLE

|  | Defatted starting lecithin | Permeate lecithin |
|---|---|---|
| Sugars | 6.8% | 0.2% |
| PC | 21.2% | 59.2% |
| PE | 17.1% | 10.9% |
| PA | 8.3% | 3.1% |
| PI | 17.0% | 1.5% |
| LPC | 2.7% | 0.9% |
| Other phospholipids | 9.6% | 2.8% |
| Other components (sterols, glucosides, glycerides, etc.) | 17.3% | 21.4% |

EXAMPLE 4

A solution of about 3.5 kg of commercial soyabean lecithin was dissolved in 30 kg of a solvent mixture consisting of hexane and ethanol in volume ratio of 95:5 and the mixture was ultrafiltered as described under Example 1. 27.7 liters of ultrafiltrate was distilled to yield 1 kg of a fatty mixture which contained according to thin layer chromatographic analysis (TLC) mostly triglyceride oil together with free sterols, sterol esters, free fatty acids and minor amounts of the fatty acid esters of the sterol glucosides.

The solvent recovered from this ultrafiltrate was added back to the retentate and the ultrafiltration continued. The next 20 liters of ultrafiltrate yielded on distillation of the solvent 0.7 kg of a fatty mixture which contained in addition to minor amounts of triglycerides and free fatty acids mainly sterols and esterified sterol glucosides and very small amounts of PC. The recovered solvent mixture was again added back to the retentate and the ultrafiltration continued. Ultimately, all the fractions were analysed by TLC and the results are shown below:

| Fraction | Solvent Mixture Used | Yield of ultrafiltered lipid | Main components according to TLC |
|---|---|---|---|
| 1 | Hexane + 5% Ethanol | 1,000 g | Triglycerides, free fatty acids, sterols and sterol esters |
| 2 | Hexane + 5% Ethanol | 700 g | Sterols, esterified sterol glucosides, PC |
| 3 | Hexane + 10% Ethanol | 730 g | Mainly PC (about 65%) rest consisting of PE, sterol glucosides and traces of PA |
| 4 | Retentate (i.e. fraction, which did not pass through the membrane) | 1,100 g | Mainly PI, PA, PE and sugars |

EXAMPLES 5-9

A number of different solvent mixtures were tried out on their effect on the fractionation and phospholipids by ultrafiltration. The equipment and circumstances used were the same as described under Example 3. The results are shown in the following Table. The products obtained (permeate and retentate lipids) were analysed semiquantitatively by thin layer chromatography. In all the following Examples defatted commercial soyabean lecithin was used, the composition of which was as follows:

| Composition of defatted soyabean lecithin used in Examples 5–9. | |
|---|---|
| Free sugars | 7.5% |
| Sterol glucosides and their esters | 12.0% |
| PC | 23.0% |
| PE | 19.0% |
| PA | 10.0% |
| PI | 22.0% |
| Others | 6.5% |

In all the Examples (5-9) it is apparent that the concentration of PC in the permeates was highly increased, whereas those of PI and sugars reduced very efficiently. PI and sugars were of course strongly enriched in the retentate fraction, i.e. the fraction which did not pass through the membrane.

| TABLE SHOWING EXAMPLES 5–9 | | | |
|---|---|---|---|
| Example No. | Membrane used (Trademark Manufacturer) | Solvent system used (vol. ratio) | Composition of the product in the permeate fraction (assessed by TLC) |
| 5 | Polyacrylonitrile (Iris 3042 ex Rhone-Poulenc) | Chloroform-Methanol (85:15) | PC = 56%<br>PA = 6%<br>PE = 23%<br>PI = <1%<br>Sugars = <1% |
| 6 | Polysulphone (DIAFLO-PM 10 ex Amicon) | Diethylether-Ethanol (75:25) | PC = 59%<br>PE = 10%<br>PA = 3%<br>PI = <0.2%<br>Sugars = <0.5% |
| 7 | Polysulphone (PM 10 ex Amicon) | 1. First run with Diethyl ether-Acetone (90:10) | Sterol glucosides and their esters = 50%<br>Sterols = 25%<br>Free fatty acids = 15%<br>PC = 10% |
|  |  | 2. Second run with Diethyl ether-Ethanol (75:25) | PC = 65%<br>PE = 10%<br>PA = 8%<br>PI = <0.2%<br>Sugars = 0.4% |
| 8 | Polysulphone (PM 10 ex Amicon) | Hexane-Ethanol-10% aq. solution of MgSO$_4$ (75:22:3) | PC = 58%<br>PE = 6%<br>PA = 2%<br>PI = <0.2%<br>Sugars = 0.3%<br>Sterol glucosides and their esters = 25% |
| 9 | Polysulphone (PN 10 ex Amicon) | Hexane-Isopropanol-Mg-Oleate (75:24.8:0.2) | PC = 62%<br>PE = 6%<br>PA = 1%<br>PI = <0.2%<br>Sugars = 0.4 |

I claim:

1. A process for the fractionation of mixtured containing phosphatides in a solution of said mixtures in a solvent system in which selective micelles formation occurs, which comprises an essentially non-polar solvent and a polar solvent which comprises the steps of:
   (a) contacting said solution with a semipermeable membrane under-pressure;
   (b) separating said solution into a permeate portion and a retentate portion, and
   (c) recovering by solvent removal a fraction enriched in at least one of the component phosphatides from one of the portions separated by the semipermeable membrane.

2. A process according to claim 1, in which the solvent system in which selective micelles formation occurs, comprises an essentially non-polar solvent selected from the group consisting of hydrocarbons, halogenated hydrocarbons, ethers and esters, and a polar solvent selected from the group consisting of lower monohydric alcohols and ketones.

3. A process according to claim 1, in which the solvent mixture in which selective micelles formation occurs comprises an essentially non-polar solvent selected from the group consisting of hexane, chloroform and diethyl ether, and a polar solvent selected from the group consisting of methanol, ethanol, propanol, isopropanol, butanol, iso-butanol, acetone and methylethyl ketone.

4. A process according to claim 1, in which the solution of the mixture is contacted with a semipermeable membrane having a cut-off limit of between about 500 to about 300,000.

5. A process according to claim 1, in which the solution of the mixture is contacted with the membrane under a pressure of between about 1 to 50 bar.

6. A process according to claim 1, in which the phosphatides-containing mixture is an alcohol-soluble phosphatide fraction.

7. A process according to claim 1, in which the phosphatides-containing mixture contains between about 1 to 30% by weight of water.

8. A process according to claim 1, in which the phosphatides-containing mixture contains between about 0.1 and 5% by weight of a salt of a cation selected from the group consisting of bivalent and trivalent cations.

9. A process according to claim 8, in which the salt is selected from the group consisting of magnesium, calcium, aluminium and iron salts.

10. A process according to claim 1, in which a fraction enriched in phosphatidyl choline is recovered from the permeate.

11. A process according to claim 1, in which a fraction enriched in phosphatidyl inositol is recovered from the retentate.

12. A process according to claim 1 in which the portion from which the said one phosphatide is recovered by solvent removal therefrom is the permeate.

13. A process according to claim 1 in which the portion from which the said one phosphatide is recovered by solvent removal therefrom is the retentate.

14. A process according to claim 4 in which the semipermeable membrane has a cut-off limit of between about 1,000 and about 15,000.

15. A process according to claim 5 in which said solution of said mixture is contacted with said membrane under a pressure of between about 2 to about 10 bar.

* * * * *